United States Patent [19]

Lauri

[11] 4,137,641
[45] Feb. 6, 1979

[54] MEANS FOR INSPECTING AN ANNULAR WORKPIECE

[76] Inventor: Angelo Lauri, 725 W. Court St., Rome, N.Y. 13440

[21] Appl. No.: 883,698

[22] Filed: Mar. 6, 1978

[51] Int. Cl.² ............................ G01B 7/31; G01B 7/34
[52] U.S. Cl. .................................. 33/178 E; 33/174 Q
[58] Field of Search ......... 33/174 Q, 178 E, DIG. 17; 73/104; 209/82

[56] References Cited

U.S. PATENT DOCUMENTS

| 2,689,409 | 9/1954 | Fry et al. | 33/178 E |
| 3,028,676 | 4/1962 | Lauri | 33/178 E |
| 4,080,741 | 3/1978 | Siddall et al. | 33/178 E |

FOREIGN PATENT DOCUMENTS

| 670201 | 10/1964 | Italy | 33/174 Q |
| 394655 | 6/1965 | Switzerland | 33/DIG. 17 |

*Primary Examiner*—Richard R. Stearns
*Attorney, Agent, or Firm*—Bruns & Jenney

[57] ABSTRACT

A method and apparatus for inspecting an annular or ring-like work element to determine if the concentricity and wall thickness of the work element is within prescribed limits. The work is mounted within a rotatable drum so that the outer wall of the work resides in contact against the inner wall of the drum. The drum is rotated about its axis at a speed such that the work is caused to rotate about its own axis of rotation in one point rolling contact with the moving drum surface. An electrical contact point is placed at a prescribed distance from the axis of the drum and is adapted to close a warning circuit in the event the concentricity or wall thickness of the work element is outside of the desired limits.

20 Claims, 7 Drawing Figures

MEANS FOR INSPECTING AN ANNULAR WORKPIECE

BACKGROUND OF THE INVENTION

This invention relates to means for inspecting ring-like work elements to rapidly and efficiently determine the concentricity and wall thickness of the workpiece.

Until recently, most cylindrical or ring-like work pieces were inspected by hand using a micrometer or a "go-no go" gauge. This type of procedure was tedious, time consuming and highly susceptible to human error. An automatic device, which was capable of rapidly and accurately inspecting annular workpieces, was developed by Lauri and is disclosed in his U.S. Pat. No. 3,028,676. In the Lauri device, the workpiece was placed within a horizontally mounted drum with the outside wall of the work resting against the inner wall of the drum. A stylus was then rotated rapidly inside the work about the axis of the drum at a prescribed radius whereby the stylus would touch the inner wall of the work when it was out of tolerance and, in response thereto, generate an alarm signal. In practice, the work element was rolled by hand about the inside of the drum which enabled the more rapidly moving stylus to interrogate an infinitely large number of points about the work in a very short period of time.

The above noted Lauri device proved to be a most expedient and economical instrument and, as a result, was readily accepted by industry. However, the relatively delicate stylus utilized therein was difficult to set up and adjust for different size workpieces and could be adversely affected by dirt and other types of contamination. Similarly, because the operator of the machine was required to perform some hand operations during the test period, the results obtained were sometimes subject to human error.

SUMMARY OF THE INVENTION

It is therefore an object of the present invention to improve the method and apparatus for inspecting annular work elements.

Another object of the present invention is to eliminate human errors in the inspection of annular work elements.

A still further object of the present invention is to provide a rugged device for inspecting annular work elements that can be quickly and efficiently set up or changed over to accept workpieces of various sizes with a minimum of lost time.

Yet another object of the present invention is to provide an automatic device for inspecting annular work elements which has the flexibility to interrogate either the inner or the outer wall of the work to determine if its concentricity and wall thickness is within allowable limits.

These and other objects of the present invention are attained by means of an inspection device for determining the concentricity and wall thickness of an annular or ring-like work element consisting of a drum like work holder having an accurately formed circular inner wall and being arranged to rotate about an axis at the exact center of the circular wall, means to support the drum at an angle with the horizon whereby the outer surface of a work element mounted therein rests in contact against the inner wall of the drum, means to rotate the drum at a speed whereby the work element is caused to rotate in rolling contact with the drum about its own axis of rotation, and a sensing probe positioned a predetermined distance from the axis of rotation of the drum that is adapted to generate a warning signal when the concentricity or the wall thickness of the work element is outside of desired limits.

BRIEF DESCRIPTION OF THE DRAWINGS

For a better understanding of these and other objects of the present invention, reference is had to the following detailed description of the invention which is to be read in conjunction with the following drawings, wherein:

FIG. 4 is an enlarged view of the probe supporting shaft and its associated locking mechanism;

FIG. 5 is a schematic illustration showing one method of forming a work element to a desired size and shape;

DESCRIPTION OF THE INVENTION

Figure 1:
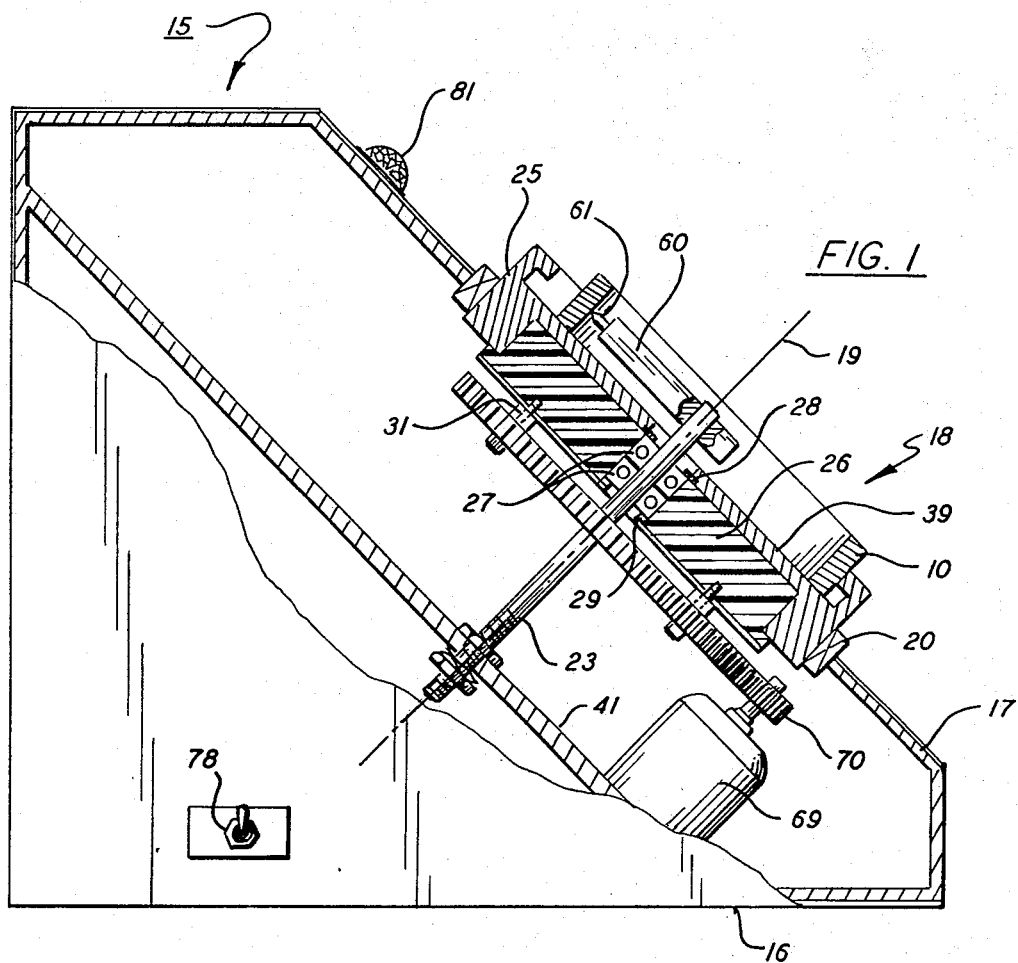
FIG. 1 is a side elevation in partial section showing apparatus embodying the present invention.

As will become apparent from the disclosure below, the present invention is directed toward a method and apparatus for inspecting manufactured components of annular configuration to determine if the parts are within prescribed limits prior to mounting them in final assembly. Of primary concern is the concentricity of the work element as well as its wall thickness. Although the equipment embodying the present invention may be employed in any number of applications, it will be explained herein in conjunction with the testing of rifling bands utilized in shells and projectiles for providing accuracy thereto. It should be clear, however, that the apparatus is extremely well suited for inspecting many and varied parts, such as bushings, bearing housings and the like, which are widely used throughout industry.

Referring initially to FIG. 5, there is shown one method by which a rifling band may be formed. Basically, the band 10 is fabricated from a piece of cylindrical stock that is drawn to a desired size against the wall of a die member 11 by holding a hardened plug 12 within the workpiece. Typically, the outer die member can be accurately machined to the required outside band diameter D and securely held in place during the forming operation whereby the prescribed outer diameter of the work is held well within limits. On the other hand, the plug 12 that is being held securely within cylindrical stock to establish the inner band diameter d usually cannot be as rigidly supported, and, as a consequence, the plug may become slightly offset from the desired centerline of the band whereby the wall thickness over the band will be caused to vary. As illustrated, one side of the wall can be formed oversized as noted at A. Correspondingly, the thickness of the wall on the opposite side of the band at B will be formed undersized. Similarly, the centerline of the plug may, during the drawing operation, become angularly offset from the desired axial centerline of the band so that as the cylindrical stock is drawn through the die 11 and over the plug 12 to form an opening which is non-concentric in regard to the axis of the piece.

As can be seen, a rifling band can thus be formed that is non-concentric and whose wall thickness is also out of tolerance as well. Detecting these not necessary mutual conditions using a hand held micrometer and/or a plug gauge is at best a relatively unsatisfactory procedure. However, by employing the method and apparatus of the present invention, this heretofore tedious task can now be fully automated to provide the user with accurate and immediate test results thus allowing each part to be inspected individually without having to slow down production.

Figure 2:
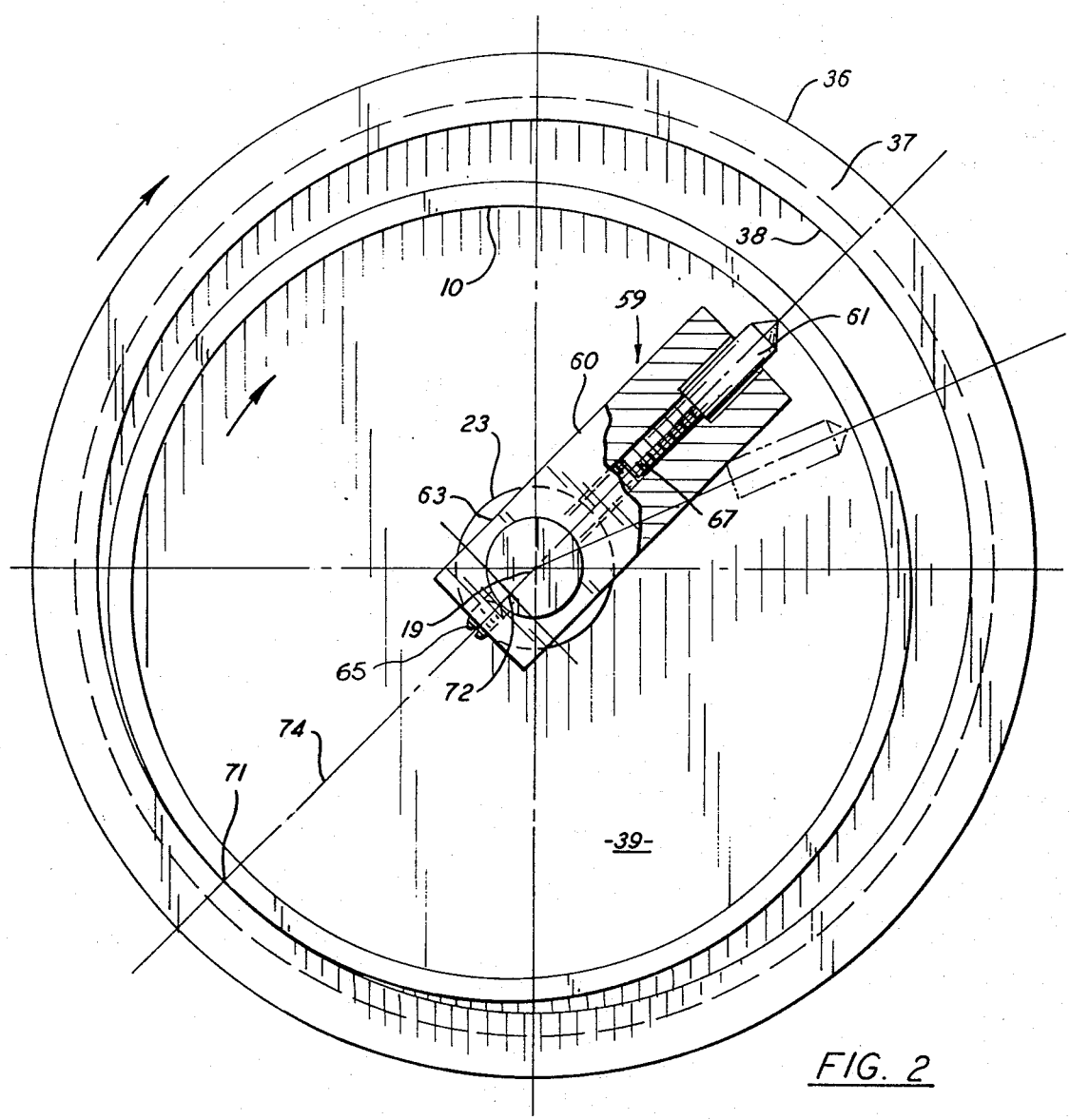
FIG. 2 is a plan view looking down at the inclined working surface contained in the apparatus of FIG. 1 illustrating the turntable and sensing probe employed therein.
Figure 3:
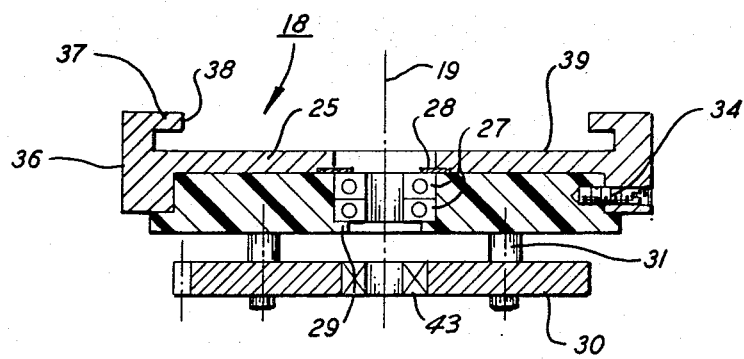
FIG. 3 is a side elevation of the turntable subassembly utilized in the present invention which more clearly illustrates the component parts thereof.

Referring now to FIGS. 1 and 2, the present device is contained within a test stand housing 15 having a generally horizontal base 16 and a support wall 17 angularly disposed from the base. A turntable subassembly 18, as more clearly depicted in FIG. 3 is centrally supported within the wall 17 with the central axis of rotation 19 of the turntable being normal to the plane of the wall. The turntable is mounted in the wall within an annular outer bearing 20 that is preferably fabricated of an insulating material so as to electrically isolate the subassembly from the rest of the housing. Any suitable outer bearing arrangement, as is well known in the art, for maintaining the turntable in concentric alignment about its axis of rotation may be used in the practice of the invention. Similarly, the turntable may also be rotatably supported solely upon a central shaft, as for example shaft 23, with an air gap provided between its outer periphery and the housing to furnish the desired isolation without departing from the teaching of the invention.

The turntable assembly includes an open ended drum 25 that is fabricated of an electrically conductive material. The drum, in turn, is mounted upon an insulating cylindrical core 26 received within a complimentary opening formed or otherwise machined in the underbody of the drum. Centrally mounted in the core is a pair of precision bearings 27—27 which are again electrically isolated from the drum 25 by means of an insulating ring 28 which further serves to hold the bearings securely seated against the lip 29 provided within the bottom of the core opening. In practice, the core may be formed of any one of many known plastics which exhibit good machinability and structural integrity under moderate loading. As best seen in FIG. 3, a spur gear 30 is mounted in coaxial alignment with the drum in assembly by means of a series of circumferentially spaced pins 31 secured in the core and the hub of the gear. The drum is locked to the core via a number of setscrews 34 passing inwardly from the peripheral wall of the drum to provide for a unitary assembly.

In practice, drum 25 includes an axially extended circular wall 36 which terminates in a depending radially extended lip 37. The inside surface 38 of the lip is accurately machined so that it is concentric with the axis of the turntable and normal to the surface of bottom wall 39. As best seen in FIG. 1, during inspecting, the annular work element is seated within the drum with its end face flush against the bottom wall surface 39 and with the outer wall thereof resting in one point contact against the inside drum surface 38. Because the turntable is inclined at some angle, generally the angle being about 45° with the horizon, the work element will remain in this general position once seated within the drum of the test stand.

Shaft 23 is secured in a support plate 41 mounted within the housing below the wall 17. In assembly, the shaft passes upwardly through the turntable assembly and terminates at about the same elevation as the top surface of the drum. Spur gear 30 is provided with a bearing 43 which allows the gear to freely turn about the shaft. The shaft is also rotatably engaged by the two bearings 27—27 mounted in the core of the turntable assembly which similarly allows the turntable to move about the shaft. The fixed or proximal end of the shaft is furnished with a threaded shank 47 (FIG. 4) which passes through plate 41. A locking nut 50 and a washer 51 are threaded down against the top surface of the plate while a friction nut 52 and a pair of opposed wave washers 53—53 are brought upwardly against its bottom surface. Sufficient holding force is applied to the shaft through the wave washer arrangement to secure the shaft in assembly while still allowing it to be rotated by hand. The purpose of this feature will be explained in further detail below.

The distal or unsupported end of the shaft, which resides within the open ended drum 25, has seated thereupon a radially extended probe 59. The probe contains an arm 60 which serves as a mounting block for a carbide sensing tip 61. A shoulder 63 is formed in the distal end of the shaft by undercutting the end portion thereof to a smaller diameter. A hole having a close running fit with the small diameter end of the shaft is formed in the arm 60 of the probe assembly which permits the probe to be slidably mounted upon the shaft. In assembly, the arm is seated against the shoulder 63 and secured in place by means of setscrew 65 to support the sensing tip of the probe at a desired elevation in respect to the work.

The sensing tip 61 of the probe is threaded into the arm by means of threaded shank 67 depending upon the tip. The tip is thus drawn into a complimentary opening contained in the end wall of the arm and securely bottomed therein to accurately locate the point of the tip a predetermined distance from the axis of the shaft, which is also the axis of rotation of the drum. The radial distance between the point of the sensing tip and the axis of rotation of the drum can be simply and quickly changed by merely replacing the probe on the shaft with one having a different length arm. This is an important feature of the invention which makes it possible for the test stand to handle bands of different diameters without any major readjustments or complex setup procedures.

Motive power to the turntable is furnished by a variable speed motor 69 of any suitable design. Although not shown, the motor is affixed to one side wall of the housing and arranged to drive spur gear 30 (FIG. 1) through means of a pinion 70 secured to the motor shaft. As can be seen, by simple varying the speed of the motor, the speed of the turntable can be conveniently regulated.

In order to inspect a work element of given dimensions, the speed of the motor is set to a speed that is sufficiently high enough to cause the workpiece to rotate against the moving inner surface 38 of lip 37. Initially the annular workpiece will "walk" up the inner surface of the drum to some determinable point, such as contact point 71, illustrated in FIG. 2, and then remain in rolling contact with the drum at about this point. When this equilibrium condition is reached, the workpiece will be revolving about its own central axis which is depicted as center 72 in FIG. 2.

Theoretically, if the work element is perfectly formed, the axis of rotation of both the turntable and the work, as well as the rolling contact point 71 between the drum and the work, will be aligned within a common plane which is depicted by centerline 74. The theoretical distance along this centerline from the center of the drum to the edge of the work can be easily ascertained. By providing for allowable tolerances, the tip of the probe can be accurately positioned within the work to sense the relative position of a work surface in regard to the drum center. Under ideal conditions, the inside wall of a perfectly formed rotating workpiece will pass continually at some fixed distance from the tip of the probe. However, when the workpiece is out of tolerance in regard to either its wall thickness or its concentricity, it will not roll true about the theoretical center 72 and the inner wall thereof will make contact with the tip of the probe.

Figure 6:
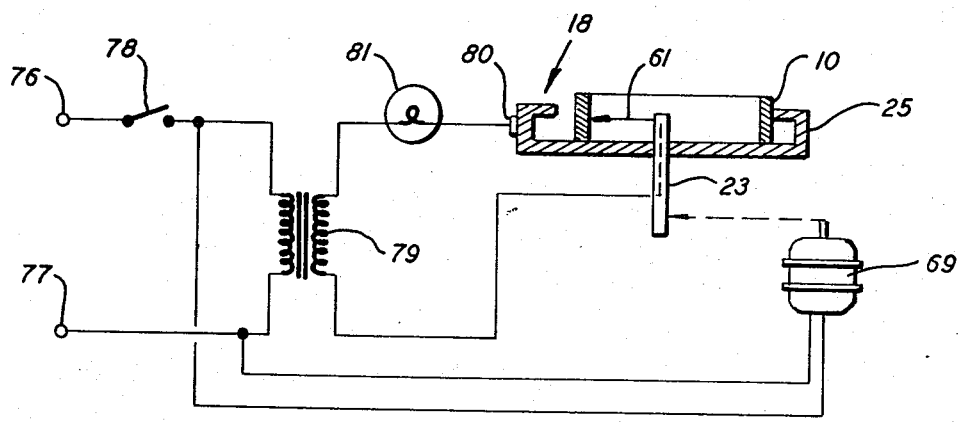
FIG. 6 is a wiring diagram illustrating a circuit for controlling the operation of the present invention and sensing the concentricity and wall thickness of the work.

As shown in FIG. 6, an alarm circuit is provided to supply a warning signal when the tip of the probe comes in contact with the work element. The circuit is powered from a 110 volt supply and connected therein at points 76, 77. An on-off switch 78 is located in one of the input lines and controls the flow of current to a step down transformer 79 and the turntable drive motor 69. The switch is physically located on one side wall of the test stand housing as illustrated in FIG. 1. Closing the switch powers the transformer and causes the turntable to rotate at a desired speed.

One side of the secondary winding of the transformer is connected to the drum 25 of turntable 18 by means of a brush contact 80. A warning lamp 81, located on the support wall 17 of the test stand directly above the turntable, is placed in series between the drum and the transformer winding. The other side of the secondary winding is connected through the shaft 23 and the block 60 to the tip 61 of the probe. As noted above, the drum of the turntable, upon which a workpiece rests, is electrically isolated from the other component of the test stand. As a result, the alarm circuit will normally remain in an open condition. However, the circuit is closed immediately upon the probe tip contacting the wall of an out of tolerance part. At this time, the lamp 81 is caused to light thus presenting a visual signal to the operator of a defective part. Although a lamp supplies the warning signal in the present device, the alarm can take almost any form including a horn or the like.

Referring once again to FIG. 2, the arm or mounting block 60 of the probe is secured to the friction mounted shaft. Accordingly, the arm, and thus the tip mounted therein can be angularly repositioned by turning the shaft against the holding force of the friction mount. As noted, the entire probe ordinarily will be changed when different diameter bands are being inspected. However, there are occasions where only the wall thickness of a given size band will change. In this event, the tip of the probe can be simply and expeditiously repositioned angularly in reference to the plane 74 as illustrated by the phantom outline in FIG. 2. This slight shifting of the tip serves to change the distance between the tip point and the axis of rotation of the band so as to accommodate a band with a thicker wall. High enough friction forces are applied to the shaft to prevent it from being moved when the probe tip contacts a workpiece, however, the force is still low enough to allow the shaft to be turned by hand.

Figure 7:
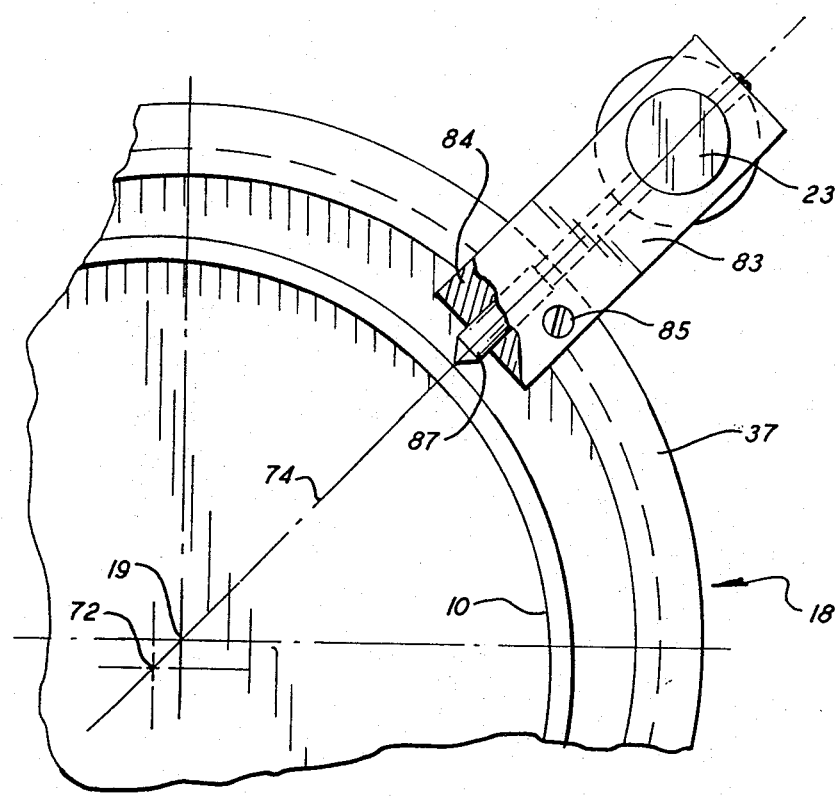
FIG. 7 is a partial plan view of the turntable illustrated in FIG. 2 showing a second means for supporting the probe within the assembly.

Although the main embodiment of the invention has been described with reference to the probe being mounted within the work element, it is also envisioned that the probe can be mounted exterior to the work as shown in FIG. 7. In this embodiment, the probe is suspended from a friction mounted shaft 23 that is located outside the perimeter of the turntable drum 25 and which operates as explained above to allow angular adjustment of the probe tip. The probe extends outwardly from the shaft by means of arm 83 which spans the rim 37 of the drum. A support block 84 is secured to the underside of the arm via screws 85 and supports a sensing tip 87 adjacent to the outer wall of the rotating workpiece 10. Here again, the point of the tip is aligned within the plane 74 containing the axis of rotation 19 of the drum and the axis of rotation of the workpiece 72 with the point being positioned a prescribed distance from the center of the drum.

Although not shown, the support block 84 can be fabricated so that it passes downwardly below the rim of the drum to position the probe about the axial center of the work. Furthermore, the tip can be spring loaded in assembly with a biasing force that would allow the tip to move back if the contact pressure between the tip and the work exceeds a predetermined value. Normally, however, when the tip touches the work, the work will shift its rolling contact position with the drum slightly to accommodate for the momentary inbalance created by the contact. Again, an alarm is generated as described above when contact occurs.

While this invention has been described with reference to the details of the invention as set forth above, the invention is not necessarily confined to the details as herein noted and this application is intended to cover any modifications and changes as may come within the scope of the following claims.

I claim:

1. Apparatus for inspecting an annular work element for variations in concentricity and wall thickness including
   an open ended drum for receiving an annular work element therein, the inner circular wall of the drum being concentric with the central axis of the drum,
   means to support the drum with its axis at an acute angle with the horizontal plane whereby the outer circular wall of a work element supported in the drum rests in contact with the inner wall of the drum,
   means to produce relative motion between the drum and the work such that the work rotates in rolling contact with the drum about a second axis of rotation within said drum,
   a probe mounted a predetermined distance from the central axis of the drum adjacent to one rotating wall of said work and having a sensing means associated therewith for providing a discernible signal in the event the probe touches the wall of the work.

2. The apparatus of claim 1 wherein said probe is positioned inside the rotating work element.

3. The apparatus of claim 1 wherein said probe is positioned outside the rotating work element.

4. The apparatus of claim 1 wherein said sensing probe contains a tip aligned within a plane containing the axis of rotation of both the drum and the work element and being arranged to contact the surface of the work when the concentricity and the wall thickness of the work is greater than a desired value.

5. The apparatus of claim 4 wherein the tip of the probe is diametrically opposite the point of rolling contact between the work and the drum.

6. Apparatus for inspecting an annular work element for variations in its concentricity and its wall thickness including
   a housing having a generally horizontal base and a support wall angularly disposed from the base,
   a turntable formed of an electrically conductive material rotatably supported in said wall about a first axis of rotation normal to the wall, said turntable having a raised outer rim having a circular inner surface that is concentric with the first axis of rotation whereby an annular work element seated upon the turntable rests in contact against said inner surface,
   drive means for rotating the turntable about said first axis of rotation at a velocity such that the work is caused to rotate in rolling contact against the rim about a second axis of rotation,
   a contact probe supported upon an arm within the work element to position a sensing tip on the probe at a predetermined distance from the first axis of rotation, and
   circuit means for placing an alarm in series relationship with the conductive turntable and the probe whereby the alarm is energized when the probe touches a conductive work element.

7. The apparatus of claim 6 further including a support shaft coaxially aligned with the first axis of rotation of the drum upon which is mounted said arm with the sensing tip of the probe lying in the same plane as the first and the second axis of rotation and being diametrically disposed from the point of rolling contact between the two rotating elements.

8. The apparatus of claim 7 further including friction means engaging said shaft so that the shaft position is angularly adjustable.

9. The apparatus of claim 7 wherein said probe and arm form an assembly that is interchangeably supported upon said shaft whereby the probe distance from the axis of the turntable may be quickly changed.

10. The apparatus of claim 6 wherein said drive means includes a gear train operatively connected to the turntable and a variable speed motor for turning the gears.

11. The apparatus of claim 6 wherein said alarm consists of a warning light positioned upon said support wall of the housing.

12. The apparatus of claim 6 further including insulating means for supporting the turntable in said support wall thereby electrically isolating the turntable.

13. The apparatus of claim 6 wherein said rim further includes a relatively thin flat faced lip depending radially inward from said rim and containing a circular inner surface concentric with the first axis of rotation.

14. The apparatus of claim 6 wherein the support wall is disposed at about a 45° angle with the horizontal base of the housing.

15. A method of inspecting an annular work element for variations in concentricity and wall thickness including
   mounting an annular work element within a drum arranged to rotate about its central axis with the outer circular wall of the work resting in contact with the inner circular wall of the drum,
   rotating the drum about its axis at a velocity such that the work is caused to rotate in rolling contact with the inner wall of the drum about its own axis of rotation,
   mounting a sensing probe a predetermined distance from the axis of said drum whereby a rotating surface of the work moves continually past the probe,
   detecting when the sensing probe touches the rotating surface of the work moving thereby.

16. A method of claim 15 wherein the probe is mounted adjacent to the inner wall of the rotating work element.

17. The method of claim 15 wherein the probe is mounted adjacent to the outer surface of the rotating work.

18. The method of claim 15 further including the step of aligning the probe within a plane containing the axis of rotation of the drum and the axis of rotation of the work.

19. The method of claim 18 further including the step of adjusting the speed of the drum in respect to the diameter of the workpiece so that the work rotates in contact with the drum at a substantially fixed point.

20. The method of claim 15 further including the step of actuating an alarm when the concentricity and wall thickness of the work is not within a predetermined limit.

* * * * *